US012513803B2

(12) United States Patent
Kann et al.

(10) Patent No.: US 12,513,803 B2
(45) Date of Patent: Dec. 30, 2025

(54) DIRECTIONAL STREETLIGHT CONTROL

(71) Applicant: Itron, Inc., Liberty Lake, WA (US)

(72) Inventors: James Lee Kann, Mica, WA (US); Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 89 days.

(21) Appl. No.: 18/377,730

(22) Filed: Oct. 6, 2023

(65) Prior Publication Data

US 2025/0119999 A1    Apr. 10, 2025

(51) Int. Cl.
*H05B 47/125* (2020.01)
*H05B 47/155* (2020.01)

(52) U.S. Cl.
CPC ......... *H05B 47/125* (2020.01); *H05B 47/155* (2020.01)

(58) Field of Classification Search
CPC ............................ H05B 47/125; H05B 47/155
See application file for complete search history.

(56) References Cited

U.S. PATENT DOCUMENTS

| | | | | |
|---|---|---|---|---|
| 2014/0265873 | A1* | 9/2014 | Marquardt | H05B 47/11 315/153 |
| 2015/0084514 | A1 | 3/2015 | Anthony et al. | |
| 2016/0286629 | A1 | 9/2016 | Chen et al. | |
| 2017/0212226 | A1* | 7/2017 | Broers | G01S 17/894 |
| 2023/0024141 | A1* | 1/2023 | Lang | H05B 47/165 |
| 2023/0232519 | A1 | 7/2023 | Secretin | |
| 2024/0080953 | A1 | 3/2024 | Broekman et al. | |

FOREIGN PATENT DOCUMENTS

| | | | |
|---|---|---|---|
| EP | 2922371 A2 | 9/2015 | |
| WO | WO-2014087274 A1 * | 6/2014 | ........... H05B 47/155 |
| WO | WO-2020148117 A1 * | 7/2020 | ......... H05B 47/1985 |
| WO | WO2021069379 A1 | 4/2021 | |
| WO | WO-2023138970 A1 * | 7/2023 | ............. H05B 45/20 |

OTHER PUBLICATIONS

Search Report and Written Opinion for International Application No. PCT/US2024/050079, Dated Jan. 28, 2025, 15 pages.
Search Report and Written Opinion for International Application No. PCT/US2024/050070, Dated Jan. 28, 2025, 15 pages.
Office Action for U.S. Appl. No. 18/377,737, dated Aug. 14, 2025, 16 Pages.

* cited by examiner

Primary Examiner — Alexander H Taningco
Assistant Examiner — Pedro C Fernandez
(74) Attorney, Agent, or Firm — Lee & Hayes, P.C.

(57) ABSTRACT

Techniques for adjusting light direction and light intensity from streetlights in an environment. For example, a streetlight may include an adjustable light source that can be configured to cast light based on its specific installation environment, taking into account height (e.g., a height of a pole coupled with the streetlight relative to a surface of the environment), an angle in which the streetlight is coupled to the pole, a type of surface being lit (e.g., blacktop, concrete, grass, etc.), an amount of light present from surrounding fixtures (e.g., streetlights), and/or an intended area to illuminate (light only streets and sidewalks, light only parking lot, light only walking paths, etc.).

20 Claims, 9 Drawing Sheets

DIRECTIONAL STREETLIGHT CONTROL

BACKGROUND

Streetlight and other types of illumination (e.g., lights that illuminate parking lots, business centers, etc.) can spill over into nearby areas or adjacent properties where it is not desired, resulting in light pollution and light trespass. Additionally, illumination is not consistent in roadways or other lit areas due to overlapping light fixture coverage areas, direction and distances light must travel, pole height and arm angle inconsistencies, and differences in types of lit surfaces, which often causes safety issues (e.g., glare from parking lots into roadways). Current methods of utilizing directional light shields are not precise and serve to block light, not direct it. Entities involved with municipal and business lighting designers and/or installers desire granular control over streetlight and parking lot light illumination direction and intensity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. Moreover, the figures are intended to illustrate general concepts, and not to indicate required and/or necessary elements.

DETAILED DESCRIPTION

Overview

Figure 1:
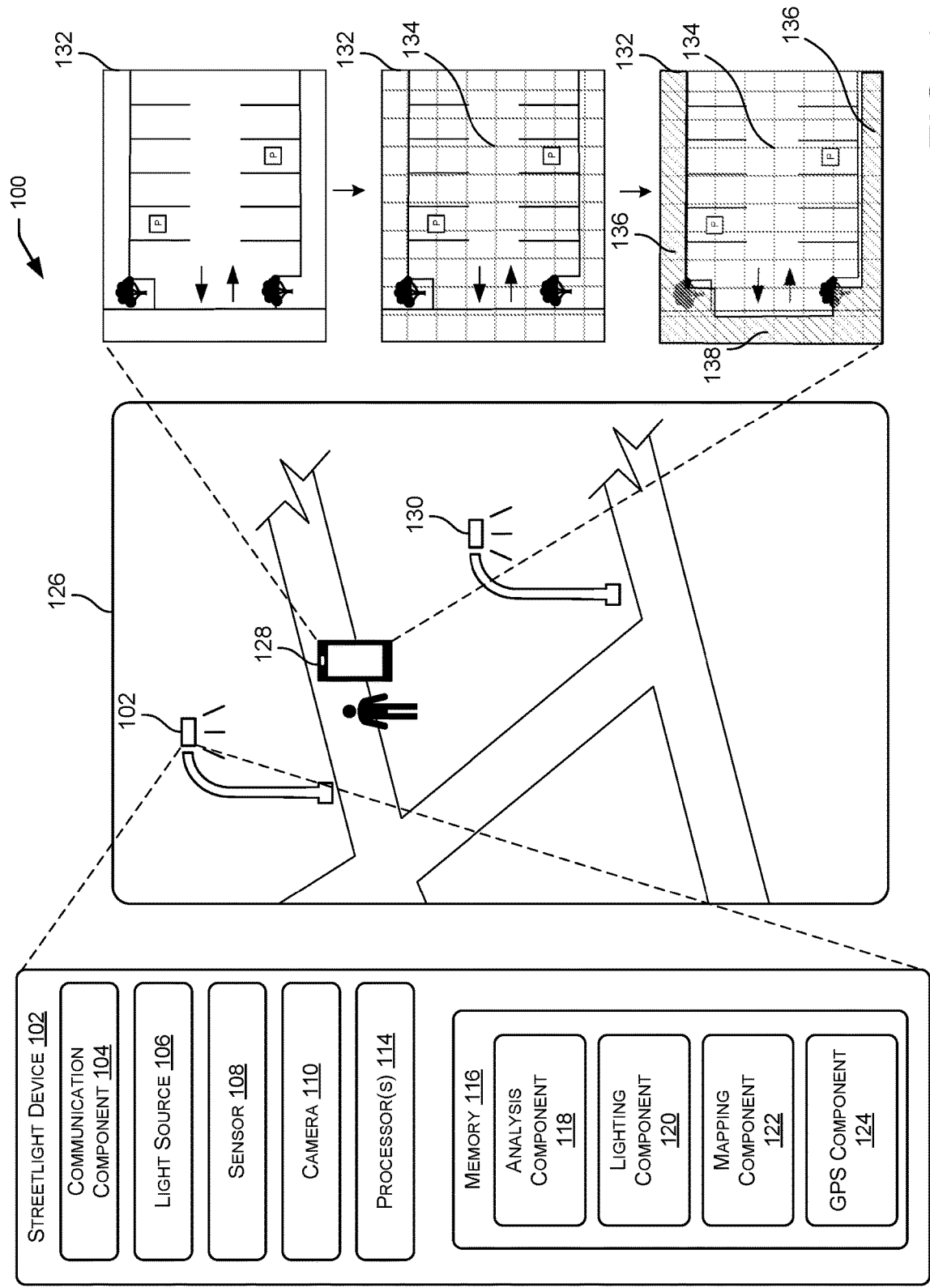
FIG. 1 is a block diagram showing an example environment in which an example streetlight device may direct light and/or change light intensity.

The disclosure describes techniques for adjusting a light source from a first configuration to a second configuration light direction and/or light intensity from streetlights in an environment. For example, a streetlight may include an adjustable light source that can be configured to cast light based on its specific installation environment, taking into account height (e.g., a height of a pole coupled with the streetlight relative to a surface of the environment), an angle at which the streetlight is coupled to the pole, a type of surface being lit (e.g., blacktop, concrete, grass, etc.), an amount of light present from surrounding fixtures (e.g., streetlights), an intended area to illuminate (light only streets and sidewalks, light only parking lot, light only walking paths, etc.), or other considerations. In some cases, the adjustable light source may include an adjustable shutter system (e.g., a physical shutter system that angles or blocks light), an adjustable LED array (e.g., selectively disabling/adjusting individual directed LEDs), and/or an adjustable micro-electro-mechanical systems (MEMS) mirror chip array, or any combination thereof. The different configurations of the light source (e.g., adjusting the light source from a first configuration to a second configuration) may include, but are not limited to, adjusting a position of at least a portion of the light source, adjusting a direction of at least a portion of the light source, a change in intensity of light, a change in color of light, a change in a wavelength of light (e.g., non-visible light, such as infrared), a change in focus of the light, and/or a change in illumination pattern (e.g., flashing, a pattern of motion such as a linear or circular scanning motion, etc.).

In some cases, the streetlight may receive sensor data from one or more sensors coupled to the streetlight and utilize the sensor data to determine adjustments to be made to the light source. For example, the streetlight (also referred to herein as the "streetlight device") can process sensor data to determine or otherwise detect a distance (e.g., a height of a pole coupled with the streetlight relative to a surface of the environment), an angle in which the streetlight is coupled to the pole, a type of surface being lit (e.g., blacktop, concrete, grass, etc.), an amount of light present from surrounding fixtures (e.g., streetlights, building lights, etc.), a type of area (parking lot, sidewalk, walking trail, street, etc.), or the like. In some examples, the streetlight device (e.g., computing device, sensor device, or the like) can receive sensor data from one or more sensors coupled to a streetlight adjacent a street, sidewalk, parking lot, or other public space. The techniques can include the streetlight device processing the sensor data to identify an environment as well as different types of areas (e.g., parking lot, sidewalk, walking trail, street, etc.) within the environment and their respective lighting settings (e.g., illuminate a parking lot and sidewalk but darken a street). In some examples, the streetlight device can identify other sensors in a vicinity of the streetlight device and/or the environment (e.g., attached to other streetlights, utility meters, transformers, etc.), and select sensors for gathering additional information about the environment.

In some examples, the streetlight device may determine how to adjust the configuration of the light source based on input data received from a user and/or a user device associated with the user. In some cases, the user may include an individual or a group of individuals who work for a municipality that is responsible for the municipality-managed lighting, business owners/managers responsible for lighting, homeowners with lighting in their yard/home, etc. For example, the user device may store and/or otherwise have access to an application configured to present light setting options and to receive user input including instructions for adjusting configurations of streetlights in an environment. The different configurations of the light source (e.g., adjusting the light source from a first configuration to a second configuration) may include, but are not limited to, adjusting a position of at least a portion of the light source, adjusting a direction of at least a portion of the light source, a change in intensity of light, a change in color of light, a change in a wavelength of light (e.g., non-visible light, such as infrared), a change in focus of the light, and/or a change in illumination pattern (e.g., flashing, a pattern of motion such as a linear or circular scanning motion, etc.). In some examples, a user may locate themselves proximate to a particular streetlight device in which the user desires to configure (e.g., adjust a light source from a first configuration to a second configuration). In some cases, the user may input an approximate height of the streetlight device and/or an approximate angle of the streetlight device relative to a surface of the environment. The user may capture image data of the environment in which the streetlight device is located using a camera of the user device and the application may receive the image data to be used for further user input. For example, the application may present the image data on the user device with a grid overlay superimposed over the image data. Each segment of the grid overlay may be selectable by the user to indicate whether that particular segment of the environment should be illuminated and/or how much illumination (e.g., a light intensity setting) the segment should receive. For example, the environment shown in the image data may include a parking lot portion, a grass portion, and a street portion. The grid overlay may include segments superimposed over each of the parking lot portion, the grass portion, and the street portion. The application may receive user input via the grid overlay indicating that the user desires that the grass portion and the street portion not receive illumination by the streetlight device. In some examples, this may be done by selection (e.g., by the user) of the segments overlayed atop the grass portion and the street portion to be darkened areas. In some examples, this may be done by selection (e.g., by the user) of the segments overlayed atop the parking lot portion to be illuminated areas. Once the application has received the illumination settings and the intensity settings for each segment of the grid overlay, the application and/or the user device may communicate (e.g., transfer via near field communication (NFC), Bluetooth, Wi-Fi, cellular, etc.) the user input (e.g., the grid overlay including the illumination settings and the intensity settings for each segment) to the streetlight device directly or indirectly via one or more intermediary device(s) and/or networks.

In some examples, the streetlight device may determine how to adjust the position of the light source and/or the intensity of the light source based on input data and/or geolocation data received from a user and/or a user device associated with the user. For example, after the user has communicatively coupled the user device with the desired streetlight device (e.g., via the application) directly or indirectly, the user may travel a perimeter of the environment in which the streetlight device is located and send geolocation data to the streetlight device via the user device while the user is traveling the perimeter of the environment. As or after the user walks the perimeter of the environment and sends the geolocation data to the streetlight device, the streetlight device may map the perimeter of the environment and store the map in a memory of the streetlight device at a geofenced region. In some cases, as or after the user walks the perimeter of the environment and the user device continuously transmits (e.g., every 0.5 seconds, every 1 second, every 5 seconds, etc.) geolocation data to the streetlight device, the user may also indicate to the streetlight device locations of other fixtures located in the environment (e.g., other streetlight devices, porch lights, etc.) and the streetlight device may include these indications of the other fixtures in the stored map. In some examples, the application and/or the user device may communicatively couple to each of the fixtures and send the geolocation data, the user input (e.g., illumination settings, intensity settings, etc.) and/or the map to each of the fixtures. In some examples, the user may travel within the perimeter of the environment and indicate to the streetlight device and/or the other fixtures within the environment which areas and/or locations within the environment need to be illuminated, darkened, dimmer, and/or brighter. In some cases, this user input may be communicated to the streetlight device and/or other fixtures such that the streetlight device and/or other fixtures may adjust in real time. In some cases, the streetlight device and/or other fixtures within the environment may use alternative and/or additional methods to determine the user and/or user device location, such as utilizing relative positioning based on a radio frequency signal strength from the streetlight device, the other fixtures, and/or the user device.

In some cases, the streetlight device may determine how to adjust the position of the light source and/or the intensity of the light source based on artificial intelligence. For example, each of the streetlight devices and/or fixtures located within the environment may be communicatively coupled as an integrated camera system. In some cases, each streetlight and/or fixture may automatically adjust its respective light source (e.g., lighting direction and/or light intensity of light source) for the environment and/or areas within the environment to be lit by recognizing basic boundaries or objects. In some examples each streetlight and/or fixture may automatically adjust light intensities based on real time image capture. In some cases, the streetlight device may store and/or otherwise have access to an AI model that may be trained to detect and/or understand what a particular object is and the differences in object surface types. For example, the AI model and/or the streetlight device may include store and/or otherwise have access to training data including a library of object images used for comparing an image to a database of images. The AI model and/or the streetlight device may then associate that image back to an object definition that includes meta data as to what material type the object is likely composed of. The identifiable images may include asphalt, concrete, grass, bark, dirt, sand, clay, rocks, gravel, and other types of materials used in parking lot, sidewalk, road, landscaping, and vehicles. Additionally, the AI model may be trained to determine if a surface is part of a parking area, landscaping area, driving area, walking area, etc. In this way, the output of the algorithm may include the surface material and surface use category. The AI model may include a Supervised Machine Learning (ML) type of AI model which may be given a set of training data that is labeled manually by data scientists to support the computer vision process of image annotation. The AI model may make a prediction as to the type of surface it sees based on the training data.

In some examples, the streetlight device can be coupled to a pole, wall, roof, tunnel, bridge, traffic signal device, tree, or any other surface in the environment, or the streetlight device may be housed in its own standalone enclosure. Multiple streetlight devices may be deployed in the environment to collectively illuminate and monitor the environment for changes in the environment that may warrant a change in light direction and/or intensity based on the user inputs and/or lighting settings. In some cases, the streetlight device may receive sensor data from a sensor that is not directly coupled to the streetlight device. For example, a sensor may be located within a threshold distance of the streetlight device and send sensor data to the streetlight device to monitor the environment and adjust lighting direction and/or intensity. Further description of directional streetlight control is discussed throughout this disclosure including with reference to FIGS. 2 and 3 below.

The techniques described herein can be implemented in a number of ways. Example implementations are provided below with reference to the following figures. Although discussed in the context of a streetlight operated by a utility service provider, the methods, apparatuses, and systems described herein can be applied to a variety of systems and is not limited to being coupled to a streetlight or used by utility systems. By way of example and not limitation, the techniques described herein may be implemented using devices and/or sensors disposed in, disposed on, coupled to, and/or part of a structure such as a streetlight, transformer, utility meter, manhole, fire hydrant, power pole, telephone pole, relay, traffic light, parking meter, building, bridge, overpass, street sign, charging station, bus stop, weather station, mailbox, collection bin (e.g., garbage, recycling, etc.), tree, or other structure in the environment. In some examples, the techniques can be utilized in a smart city, or in any system using sensor data. When the techniques are applied in the smart city, a device can be configured to exchange data with entities of the smart city to remedy or reduce impact of an incident.

Example Systems and Techniques

FIG. 1 is a block diagram showing an example environment 100 in which an example streetlight device (streetlight device 102) configures portions of a light source to affect light direction and/or light intensity in an environment based on user input. As shown in FIG. 1, the streetlight device 102 includes a communication component 104, a light source(s) 106, sensor(s) 108, camera(s) 110, one or more processors 114 and a memory 116 that may include an analysis component 118, a lighting component 120, a mapping component 122, and a GPS component 124, and is shown coupled to a location 126 (e.g., a streetlight, a portion of a public right-of-way, a building, or other structure). In some cases, the streetlight device 102 is configured to communicate with and/or receive user input from a user device 128.

The streetlight device 102 can include or otherwise represent software, firmware, and/or hardware for implementing the techniques described herein. Generally, the streetlight device 102 can represent functionality to receive user input including lighting instructions for a given environment and adjust a light source from a first configuration to a second configuration for the environment based on the user input and sensor data. The different configurations of the light source (e.g., adjusting the light source from a first configuration to a second configuration) may include, but are not limited to, adjusting a position of at least a portion of the light source, adjusting a direction of at least a portion of the light source, a change in intensity of light, a change in color of light, a change in a wavelength of light (e.g., non-visible light, such as infrared), a change in focus of the light, and/or a change in illumination pattern (e.g., flashing, a pattern of motion such as a linear or circular scanning motion, etc.).

The communication component 104 can provide functionality to enable the streetlight device 102 to communicate with another computing device (e.g., user device 128), sensor device, a utility company central office, and so on. The communication component 104 may be configured to format data, such as into frames or data packets associated with one or more communications protocols that facilitate one-way and/or two-way communication with entities external to the streetlight device 102. As an example, the communication component 104 may include a radio frequency (RF) transmitter, receiver and/or transceiver (not shown) to facilitate wireless communications, a power line communications (PLC) transceiver (not shown) for communication via a power line, a direct communication interface, etc. In some cases, the communication component 104 may include an application programming interface (API) configured to communicate with other APIs stored on other devices, such as an API stored on the user device 128.

In various examples, the communication component 104 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable current or future wired or wireless communications protocol that enables the streetlight device 102 to interface with the other computing device(s). For instance, the communication component 104 may be configured to receive input data from the user device 128 and/or one or more other fixtures within the environment, such as fixture 130 (which may also be a streetlight device). In some cases, this input data from other fixtures in the environment may include a change in lighting status of the fixture (e.g., the fixture has decreased light intensity and/or the fixture has adjusted light direction).

The light source 106 may include a type of light fixture that can be programmed to direct light only where desired and at granular intensities. For example, the light source 106 may include an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

The sensor(s) 108 can include one or more of: a photoelectric sensor, a photodiode sensor, a microphone, a camera, a location sensor, a lidar sensor, a radar sensor, an infrared sensor, a gas sensor, an electrical sensor, a fluid sensor, a temperature sensor, a time-of-flight sensor, an ultrasonic sensor, and an inertial sensor (e.g., to detect theft, seismic activity, etc.), just to name a few. As mentioned, the sensor(s) 108 may be coupled to a variety of fixtures within the environment (e.g., the location 126) or structures including but not limited to: a pole, a streetlight (e.g., fixture 130), a wall, a tunnel, a fire hydrant, a sign, an electrical distribution point, a gas conduit, a water conduit, a manhole, a storage tank (of water, gas, etc.), or another surface in the environment. In some cases, the sensor(s) 108 may include the camera 110 or may be a separate sensor device from the camera 110.

The memory 116 may comprise computer-readable storage media that includes, but is not limited to, RAM, ROM, EEPROM, flash memory, cache memory, or other hardware storage devices or hardware-based memory technology. The memory 116 may include instructions that cause the processor(s) 114 to perform the operations and/or techniques discussed herein.

The analysis component 118 is configured to receive data from the one or more sensor(s) (e.g., the sensor(s) 108, sensor(s) of another sensor device, etc.) and process the sensor data to detect a change in the environment 100 in which the streetlight device 102 is located. In some examples, each streetlight within the environment 100 and/or fixture (e.g., fixture 130) may automatically adjust its respective light source (e.g., lighting direction and/or light intensity of light source) for the environment and/or areas within the environment to be lit by recognizing basic boundaries or objects, which may include automatically adjusting light direction and light intensities based on real time image capture via the sensor(s) 108 and/or the camera 110.

In various examples, the analysis component 118 can receive sensor data (e.g., audio data, image data, a message and/or transmission from another device, etc.) from the sensor(s) 108 as input to determine that an object has moved within the environment 100 from a first location to a second location. For example, in a parking lot, a vehicle may have exited the parking lot and/or may have entered the parking lot, thereby changing the lighting dynamics within the parking lot. In this case, the analysis component 118 may determine that the lighting direction and/or the lighting intensities specified by the user via the user input may no longer be satisfied within the parking lot and may send instructions to the lighting component 120 to adjust the lighting direction and/or the lighting intensities to account for the change in lighting dynamics caused by the object (e.g., if a new vehicle is creating a shaded area in an area specified to be illuminated, the streetlight device 102 may adjust the lighting direction and/or the lighting intensity to illuminate the shaded area). In some examples, the analysis component 118 can implement statistical, mathematical, and/or machine learned algorithms to determine whether the sensor data indicates a change in the lighting dynamics of the environment with respect to the lighting settings specified by the user in the user input.

In some examples, the analysis component 118 can receive sensor data (e.g., audio data, image data, etc.) from the sensor(s) 108 as input to determine other types of information associated with the streetlight device 102 and/or the environment 100. For example, the analysis component 118 may process sensor data to determine or otherwise detect a distance (e.g., a height of a pole coupled with the streetlight relative to a surface of the environment), an angle in which the streetlight device 102 is coupled to the pole, a type of surface being lit (e.g., blacktop, concrete, grass, metal, glass, etc.), an amount of light present from surrounding fixtures (e.g., streetlights), a type of area (parking lot, sidewalk, walking path, street, a no trespassing zone, a residential area, a commercial business area, etc.), or the like. In some examples, the analysis component 118 can receive sensor data from one or more sensors coupled to a streetlight adjacent a street, sidewalk, parking lot, or other public space. The techniques can include the analysis component 118 processing the sensor data to identify an environment as well as different types of areas (e.g., parking lot, sidewalk, walking path, street, a no trespassing zone, a residential area, a commercial business area, etc.) within the environment and their respective lighting settings (e.g., illuminate a parking lot and sidewalk but darken a street). In some examples, the analysis component 118 can identify other sensors in a vicinity of the streetlight device and/or the environment (e.g., attached to other streetlights, utility meters, transformers, etc.), and select sensors for gathering additional information about the environment.

The lighting component 120 may be configured to control one or more aspects of the lighting source 106. The lighting component 120 can receive inputs from the analysis component 118, the mapping component 122, the GPS component 124, and other components and, in turn, can control the frequency and/or voltage of the power applied to the light source 106. Thus, the lighting component 120 may, for example, slowly increase voltage to the light source 106 as the sun sets, and vice-versa, to maintain a consistent level of illumination at the street level. The lighting component 120 may also be configured to adjust features of the light source 106 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

The mapping component 122 may be configured to enable the streetlight device 102 to determine how to adjust the position of the light source and/or the intensity of the light source based on input data received from a user and/or the user device 128 associated with the user. For example, the user device 128 may store and/or otherwise have access to an application configured to present light setting options and to receive user input including instructions for adjusting light direction and light intensity from streetlights (e.g., streetlight device 102 and/or fixture 130) in an environment. In some examples, a user may locate themselves proximate to the streetlight device 102 in which the user desires to configure (e.g., adjust a light source from a first configuration to a second configuration). In some cases, the user may input an approximate height of the streetlight device 102 and/or an approximate angle of the streetlight device relative to a surface of the location 126. The user may capture image data of the environment, such as image data 132, in which the streetlight device 102 is located using the camera of the user device 128 and the application may receive the image data to be used for further user input. For example, the application may present the image data 132 (which in this case, may be an image and/or map of a parking lot) on the user device with a grid overlay 134 superimposed over the image data 132. Each segment of the grid overlay 134 may be selectable by the user to indicate whether that particular segment of the image data 132 should be illuminated and/or how much illumination (e.g., a light intensity setting) the segment should receive. For example, the environment shown in the image data 132 may include a parking lot portion, a grass portion, and a street portion. The grid overlay 134 may include segments (e.g., portions, sections, etc.) superimposed over each of the parking lot portion, the grass portion, and the street portion. In some examples, the application may receive user input via the grid overlay 134 indicating that the user desires the grass portion 136 and the street portion 138 should not receive illumination by the streetlight device 102. In some examples, this may be done by selection (e.g., by the user) of the segments overlayed atop the grass portion 136 and the street portion 138 to be darkened areas. In response to receiving selection of the grass portion 136 and the street portion 138, the mapping component 122 may change the color and/or otherwise visually indicate on the image data 132 that the segments selected by the user sending the grid overlay and the user input data to the streetlight device are not to receive illumination. In some examples, the user may also select portions of the location 126 and the image data 132 that the user does desire to have illuminated by selecting segments overlayed atop the parking lot portion to be illuminated areas. Once the application has received the illumination settings and the intensity settings for each segment of the grid overlay 134, the application and/or the user device 128 may communicate (e.g., transfer via near field communication (NFC), Bluetooth, Wi-Fi, cellular, etc.) the user input (e.g., the grid overlay including the illumination settings and the intensity settings for each segment) to the mapping component 122 of the streetlight device 102 directly or indirectly via one or more intermediary device and/or networks. These user input and/or user light settings may be used by the analysis component 118 and/or the lighting component 120 to adjust the light source 106 from a first configuration to a second configuration based on sensor data received from the sensor(s) 108. The different configurations of the light source 106 (e.g., adjusting the light source 106 from a first configuration to a second configuration) may include, but are not limited to, adjusting a position of at least a portion of the light source 106, adjusting a direction of at least a portion of the light source 106, a change in intensity of light, a change in color of light, a change in a wavelength of light (e.g., non-visible light, such as infrared), a change in focus of the light, and/or a change in illumination pattern (e.g., flashing, a pattern of motion such as a linear or circular scanning motion, etc.).

The GPS component 124 may be configured to enable the streetlight device 102 to determine how to adjust the position of the light source 106 and/or the intensity of the light source 106 based on input data and/or geolocation data received from a user and/or a user device 128 associated with the user. For example, after the user has communicatively coupled the user device 128 with the desired streetlight device 102 (e.g., via the application), the user may travel a perimeter of the environment 100 and/or the location 126 in which the streetlight device 102 is located and send geolocation data to the streetlight device 102 via the user device 128 while the user is traveling the perimeter of the environment 100 and/or location 126. In some cases, communicatively coupling the user device 128 with the streetlight device 102 may be performed directly with the streetlight device 102 (e.g., via Bluetooth). In other cases, communicatively coupling the user device 128 with the streetlight device 102 may be performed via connection to a backend server (e.g., of a central office) via a cellular data connection. As the user walks the perimeter of the environment 100 and/or location 126 and sends the geolocation data to the streetlight device 102, the streetlight device 102 may map the perimeter of the environment 100 and/or location 126 and generate image data, such as the image data 132, and store the map and/or the image data 132 in a memory of the streetlight device 102. In some cases, as the user walks the perimeter of the environment 100 and/or location 126 and the user device 128 continuously transmits (e.g., every 0.5 seconds, every 1 second, every 5 seconds, etc.) geolocation data to the streetlight device 102, the user may also indicate to the streetlight device 102 locations of other fixtures located in the environment 100 and/or location 126 (e.g., other streetlight devices, porch lights, the fixture 130, etc.) and the streetlight device 102 may include these indications of the other fixtures in the stored image data 132 and/or the map (e.g., the map may include the image data 132). In some examples, the application and/or the user device 128 may communicatively couple to each of the fixtures and send the geolocation data, the user input (e.g., illumination settings, intensity settings, etc.) and/or the image data 132 and/or the map to each of the fixtures. In some examples, the user may travel within the perimeter of the environment 100 and/or location 126 and indicate to the streetlight device 102 and/or the other fixtures within the environment 100 and/or location 126 which areas and/or locations within the environment 100 and/or location 126 need to be illuminated, darkened, dimmer, and/or brighter. In some cases, this user input may be communicated to the streetlight device 102 and/or other fixtures such that the streetlight device 102 and/or other fixtures may adjust in real time. In some cases, the streetlight device 102 and/or other fixtures within the environment 100 and/or location 126 may use alternative and/or additional methods to determine the user and/or user device 128 location, such as utilizing relative positioning based on a radio frequency signal strength from the streetlight device 102, the other fixtures, and/or the user device 128.

Figure 2:
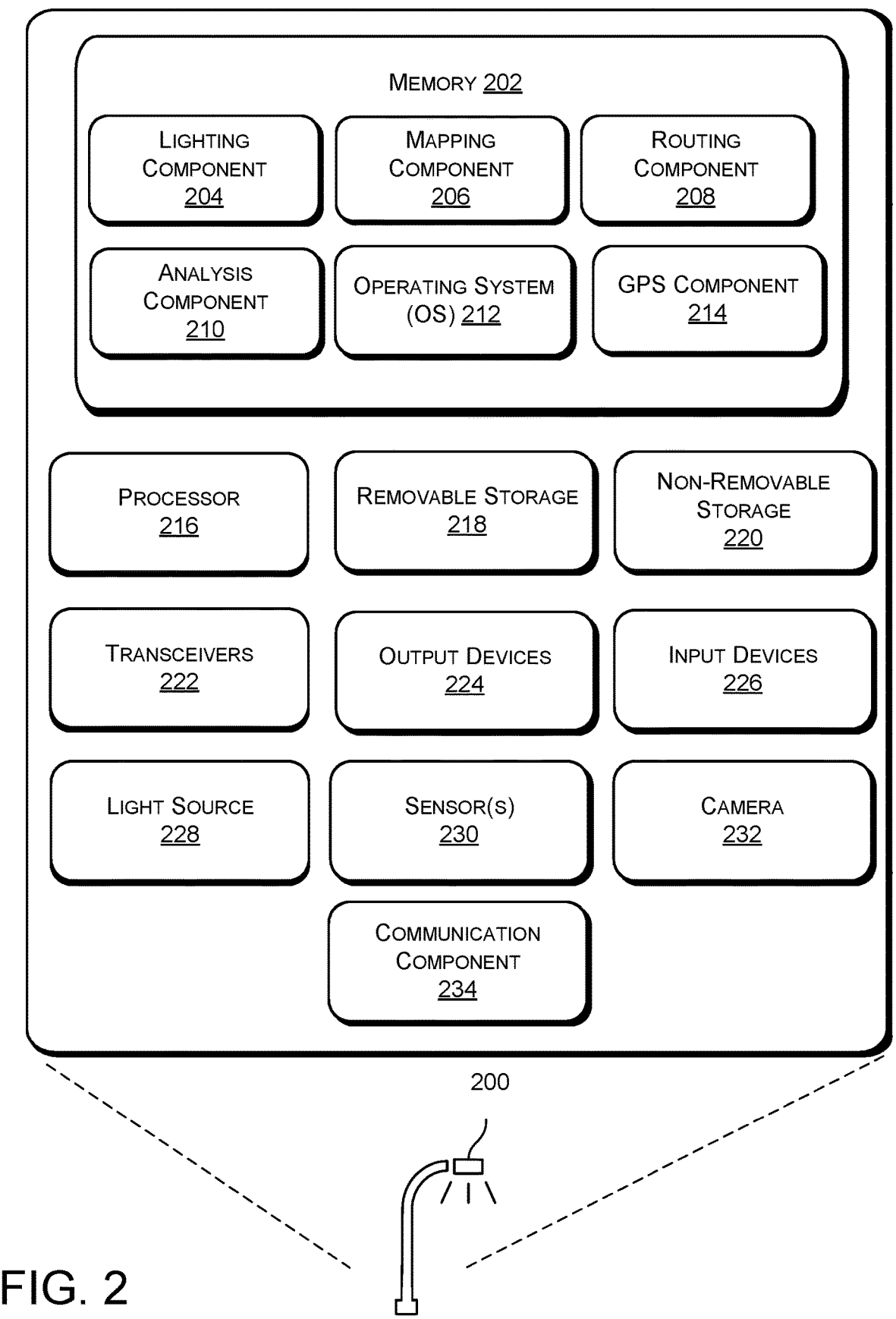
FIG. 2 is a block diagram showing an example streetlight device, as described herein.

FIG. 2 illustrates an example streetlight device 200, which may be the same or similar to the streetlight device 102 of FIG. 1, that may include components such as, for example, one or more processor(s) 216, memory 202, a lighting control component 204, mapping component 206, routing component 208, analysis component 210, operating system (OS) 212 and GPS component 214.

As the name implies, the lighting component 204 can control one or more aspects of the light source 228. The lighting component 204 can receive inputs from the analysis component 210, the mapping component 206, the GPS component 214, the sensor(s) 230, and other components and, in turn, can control the frequency and/or voltage (e.g., the light source 228 configuration) of the power applied to the light source 228. Thus, the lighting component 204 may, for example, slowly increase voltage to the light source 228 as the sun sets, and vice-versa, to maintain a consistent level of illumination at the street level. The lighting component 204 may also be configured to adjust features of the light source 228 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

The mapping component 206 may be configured to enable the streetlight device 200 to determine how to adjust the position of the light source and/or the intensity of the light source based on input data received from a user and/or the user device 128 associated with the user. For example, the user device 128 may store and/or otherwise have access to an application configured to present light setting options and to receive user input including instructions for adjusting light direction and light intensity from streetlights (e.g., streetlight device 200 and/or fixture 130) in an environment. In some examples, a user may locate themselves proximate to the streetlight device 200 in which the user desires to configure (e.g., adjust from a first configuration to a second configuration). In some cases, the user may input an approximate height of the streetlight device 200 and/or an approximate angle of the streetlight device relative to a surface of the location 126. The user may capture image data of the environment, such as image data 132, in which the streetlight device 200 is located using a camera of the user device 128 and the application may receive the image data to be used for further user input. For example, the application may present the image data 132 (which in this case, may be an image and/or map of a parking lot) on the user device 128 with a grid overlay 134 superimposed over the image data 132. Each segment of the grid overlay 134 may be selectable by the user to indicate whether that particular segment of the image data 132 should be illuminated and/or how much illumination (e.g., a light intensity setting) the segment should receive. For example, the environment shown in the image data 132 may include a parking lot portion, a grass portion, and a street portion. The grid overlay 134 may include segments superimposed over each of the parking lot portion, the grass portion, and the street portion. In some examples, the application may receive user input via the grid overlay 134 indicating that the user desires the grass portion 136 and the street portion 138 should not receive illumination by the streetlight device 200. In some examples, this may be done by selection (e.g., by the user) of the segments overlayed atop the grass portion 136 and the street portion 138 to be darkened areas. In response to receiving selection of the grass portion 136 and the street portion 138, the mapping component 206 may change the color and/or otherwise visually indicate on the image data 132 that the segments selected by the user are not to receive illumination. In some examples, the user may also select portions of the location 126 and the image data 132 that the user does desire to have illuminated by selecting segments overlayed atop the parking lot portion to be illuminated areas. Once the application has received the illumination settings and the intensity settings for each segment of the grid overlay 134, the application and/or the user device 128 may communicate (e.g., transfer via near field communication (NFC), Bluetooth, Wi-Fi, cellular, etc.) the user input (e.g., the grid overlay including the illumination settings and the intensity settings for each segment) to the mapping component 206 of the streetlight device 200 directly or indirectly via one or more intermediary device(s) and/or network(s). These user input and/or user light settings may be used by the analysis component 210 and/or the lighting component 204 to adjust the configuration for the light source 228 based on sensor data received from the sensor(s) 230.

The routing component 208 can be used to route cellular and wireless communications between users and the streetlight device 200. The routing component 208 can include, for example, a cellular router, a Wi-Fi router, and/or a Bluetooth router, among other things. The routing component 208 can be used in conjunction with user device 128 and/or the application running on the user device 128 to perform the operations discussed herein.

The analysis component 210 is configured to receive data from the one or more sensor(s) (e.g., the sensor(s) 230, sensor(s) of another sensor device) and process the sensor data to detect a change in the environment in which the streetlight device 200 is located. In some examples, each streetlight within the environment and/or fixture (e.g., fixture 130) may automatically adjust its respective light source (e.g., lighting direction and/or light intensity of light source) for the environment and/or areas within the environment to be lit by recognizing basic boundaries or objects, which may include automatically adjusting light direction and light intensities based on real time image capture via the sensor(s) 230 and/or the camera 232.

In various examples, the analysis component 210 can receive sensor data (e.g., audio data, image data, etc.) from the sensor(s) 230 as input to determine that an object has moved within the environment from a first location to a second location. For example, in a parking lot, a vehicle may have exited the parking lot and/or may have entered the parking lot, thereby changing the lighting dynamics within the parking lot. In this case, the analysis component 210 may determine that the lighting direction and/or the lighting intensities specified by the user via the user input may no longer be satisfied within the parking lot and may send instructions to the lighting component 204 to adjust the lighting direction and/or the lighting intensities to account for the change in lighting dynamics caused by the object (e.g., if a new vehicle is creating a shaded area in an area specified to be illuminated, the streetlight device 200 may adjust the lighting direction and/or the lighting intensity to illuminate the shaded area). In some examples, the analysis component 210 can implement statistical, mathematical, and/or machine learned algorithms to determine whether the sensor data indicates a change in the lighting dynamics of the environment with respect to the lighting settings specified by the user in the user input.

In some examples, the analysis component 210 can receive sensor data (e.g., audio data, image data, etc.) from the sensor(s) 230 as input to determine other types of information associated with the streetlight device 200 and/or the environment. For example, the analysis component 210 may process sensor data to determine or otherwise detect a distance (e.g., a height of a pole coupled with the streetlight relative to a surface of the environment), an angle in which the streetlight device 200 is coupled to the pole, a type of surface being lit (e.g., blacktop, concrete, grass, etc.), an amount of light present from surrounding fixtures (e.g., streetlights), a type of area (parking lot, sidewalk, walking trail, street, etc.), or the like. In some examples, the analysis component 210 can receive sensor data from one or more sensors coupled to a streetlight adjacent a street, sidewalk, parking lot, or other public space. The techniques can include the analysis component 210 processing the sensor data to identify an environment as well as different types of areas (e.g., parking lot, sidewalk, walking trail, street, etc.) within the environment and their respective lighting settings (e.g., illuminate a parking lot and sidewalk but darken a street). In some examples, the analysis component 210 can identify other sensors in a vicinity of the streetlight device and/or the environment (e.g., attached to other streetlights, utility meters, transformers, etc.), and select sensors for gathering additional information about the environment.

The GPS component 214 can receive and interpret data from a GPS system, including timestamping information from one or more GPS satellites. The GPS component 214 can provide this information to the OS 212, for example, and/or the routing component 208 for cellular and/or wireless timestamping and routing purposes. The GPS component 214 may be configured to enable the streetlight device 200 to determine how to adjust the position of and/or the intensity of the light source 228 based on input data and/or geolocation data received from a user and/or a user device 128 associated with the user. For example, after the user has communicatively coupled the user device 128 with the desired streetlight device 200 (e.g., via the application), the user may travel a perimeter of the environment and/or the location in which the streetlight device 200 is located and send geolocation data to the streetlight device 200 via the user device 128 while the user is traveling the perimeter of the environment and/or location. As the user walks the perimeter of the environment and/or location and sends the geolocation data to the streetlight device 200, the streetlight device 200 may map the perimeter of the environment and/or location and generate image data, such as the image data 132, and store the map and/or the image data 132 in a memory of the streetlight device 200 (e.g., via the mapping component 206). In some cases, as the user walks the perimeter of the environment and/or location and the user device 128 continuously transmits (e.g., every 0.5 seconds, every 1 second, every 5 seconds, etc.) geolocation data to the streetlight device 200, the user may also indicate to the streetlight device 200 locations of other fixtures located in the environment and/or location (e.g., other streetlight devices, porch lights, the fixture 130, etc.) and the streetlight device 200 may include these indications of the other fixtures in the stored image data 132 and/or the map (e.g., the map may include the image data 132). In some examples, the application and/or the user device 128 may communicatively couple to each of the fixtures and send the geolocation data, the user input (e.g., illumination settings, intensity settings, etc.) and/or the image data 132 and/or the map to each of the fixtures. In some examples, the user may travel within the perimeter of the environment and/or location and indicate to the streetlight device 200 and/or the other fixtures within the environment and/or location which areas and/or locations within the environment and/or location need to be illuminated, darkened, dimmer, and/or brighter. In some cases, this user input may be communicated to the streetlight device 200 and/or other fixtures such that the streetlight device 200 and/or other fixtures may adjust in real time. In some cases, the streetlight device 200 and/or other fixtures within the environment and/or location may use alternative and/or additional methods to determine the user and/or user device 128 location, such as utilizing relative positioning based on a radio frequency signal strength from the streetlight device 200, the other fixtures, and/or the user device 128.

The streetlight device 200 may also include additional data storage devices (removable and/or non-removable) such as, for example, magnetic disks, optical disks, or tape. Such additional storage is illustrated in FIG. 2 by removable storage 218 and non-removable storage 220. The removable storage 218 and non-removable storage 220 can store the various components 204, 206, 208, 210, 214 and the OS 212, among other things. This can enable the streetlight device 200 to be fully or partially configured to provide graphical user interfaces (GUIs), for example, to enable users and/or technicians to connect to the streetlight device 200. The removable storage 218 and non-removable storage 220 can also include setup menus, other GUIs, and other functions.

Non-transitory computer-readable media may include volatile and nonvolatile, removable and non-removable tangible, physical media implemented in technology for storage of information, such as computer readable instructions, data structures, program components, or other data. The memory 202, removable storage 218, and non-removable storage 220 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the streetlight device 200. Any such non-transitory computer-readable media may be part of the streetlight device 200 or may be a separate database, databank, remote server, or cloud-based server.

In some implementations, the transceivers 222 include any sort of micro wireless devices known in the art. In some examples, the transceivers 222 can include wireless modem(s) to facilitate wireless connectivity between users and the cellular network, the Internet and/or an intranet via a cellular connection. Further, the transceivers 222 may include a radio micro wireless device that performs the function of transmitting and receiving radio frequency communications via an antenna (e.g., Wi-Fi or Bluetooth). In other examples, the transceivers 222 may include wired communication components, such as a wired modem or Ethernet port, for communicating with technicians, for example, and the provider's Internet-based network.

In some implementations, the output device(s) 224 include any sort of output devices known in the art, such as a display (e.g., a liquid crystal or thin-film transistor (TFT) display), a touchscreen display, loudspeakers, a vibrating mechanism, or a tactile feedback mechanism. In some examples, the output devices can play various sounds based on, for example, whether the streetlight device 200 is connected to a network, the type of connections (e.g., cellular vs. Wi-Fi), the number of active calls, etc. for testing purposes. Output device(s) 224 also include ports for one or more peripheral devices, such as headphones, peripheral speakers, or a peripheral display for use by technicians during maintenance procedures, among other things.

In various implementations, input device(s) 226 include any sort of input devices known in the art. For example, the input device(s) 226 may include one or more still or video cameras (e.g., camera 232, discussed above), a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

The light source 228 may include a type of light fixture that can be programmed to direct light only where desired and at granular intensities. For example, the light source 228 may include an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

The sensor(s) 230 can include one or more of: a photoelectric sensor, a photodiode sensor, a microphone, a camera, a location sensor, a lidar sensor, a radar sensor, an infrared sensor, a gas sensor, an electrical sensor, a fluid sensor, a temperature sensor, a time-of-flight sensor, an ultrasonic sensor, and an inertial sensor (e.g., to detect theft, seismic activity, etc.), just to name a few. As mentioned, the sensor(s) 230 may be coupled to a variety of fixtures within the environment (e.g., the location 126) or structures including but not limited to: a pole, a streetlight (e.g., fixture 130), a wall, a tunnel, a fire hydrant, a sign, an electrical distribution point, a gas conduit, a water conduit, a manhole, a storage tank (of water, gas, etc.), or another surface in the environment. In some cases, the sensor(s) 230 may include the camera 232 or may be a separate sensor device from the camera 232.

The communication component 234 can provide functionality to enable the streetlight device 200 to communicate with another computing device (e.g., user device 128), sensor device, a utility company central office, and so on. The communication component 234 may be configured to format data, such as into frames or data packets associated with one or more communications protocols that facilitate one-way and/or two-way communication with entities external to the streetlight device 200. As an example, the communication component 234 may include a radio frequency (RF) transmitter, receiver and/or transceiver (not shown) to facilitate wireless communications, a power line communications (PLC) transceiver (not shown) for communication via a power line, a direct communication interface, etc. In some cases, the communication component 234 may include an application programming interface (API) configured to communicate with other APIs stored on other devices, such as an API stored on the user device 128.

Figure 3:
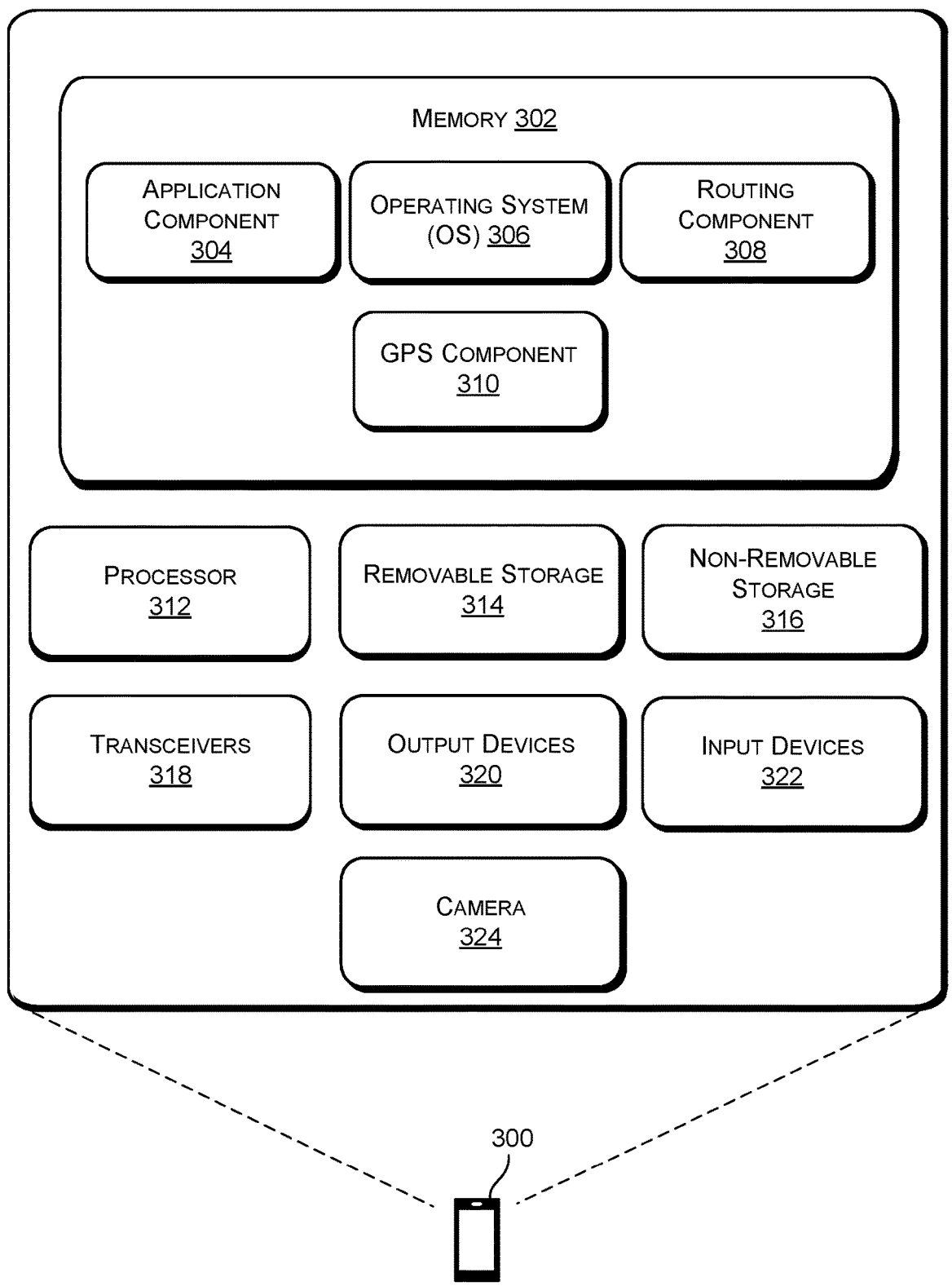
FIG. 3 is a block diagram showing an example user device, as described herein.

FIG. 3 illustrates an example user device 300, which may be the same or similar to user device 128, that may include components such as, for example, one or more processor(s) 312, a memory 302 which may include components such as, for example, an application component 304, an operating system 306, a routing component 308, and/or a GPS component 310. The user device 300 may include, for example, a computing device, a mobile phone, a tablet, a laptop, and/or one or more servers. The components of the user device 300 will be described below by way of example. It should be understood that the example provided herein is illustrative and should not be considered the exclusive example of the components of the electronic device 300.

The application component 304 may be configured to present light setting options and to receive user input including instructions for adjusting light direction and light intensity from streetlights in an environment. In some examples, a user may locate themselves proximate to a particular streetlight device in which the user desires to configure (e.g., adjust from a first configuration to a second configuration). In some cases, the user may input, via the application component 304, an approximate height of the streetlight device and/or an approximate angle of the streetlight device relative to a surface of the environment. The user may capture, via the application component 304, image data of the environment in which the streetlight device is located using a camera 324 of the user device and the application component 304 may receive the image data to be used for further user input. For example, the application component 304 may present the image data on the user device with a grid overlay superimposed over the image data. Each segment of the grid overlay may be selectable by the user to indicate whether that particular segment of the environment should be illuminated and/or how much illumination (e.g., a light intensity setting) the segment should receive. For example, the environment shown in the image data may include a parking lot portion, a grass portion, and a street portion. The grid overlay may include segments superimposed over each of the parking lot portion, the grass portion, and the street portion. The application component 304 may receive user input via the grid overlay indicating that the user desires that the grass portion and the street portion not receive illumination by the streetlight device. In some examples, this may be done by selection (e.g., by the user) of the segments overlayed atop the grass portion and the street portion to be darkened areas. In some examples, this may be done by selection (e.g., by the user) of the segments overlayed atop the parking lot portion to be illuminated areas. Once the application component 304 has received the illumination settings and the intensity settings for each segment of the grid overlay, the application component 304 and/or the user device may communicate (e.g., transfer via near field communication (NFC), Bluetooth, Wi-Fi, cellular, etc.) the user input (e.g., the grid overlay including the illumination settings and the intensity settings for each segment) to the streetlight device directly or indirectly via one or more intermediary device(s) and/or network(s).

The routing component 308 can be used to route cellular and wireless communications between streetlight devices and/or fixtures and the user device 300. The routing component 308 can include, for example, a cellular router, a Wi-Fi router, and/or a Bluetooth router, among other things. The routing component 308 can be used in conjunction with streetlight device 102 and/or the application running on the streetlight device 102 to perform the operations discussed herein.

The GPS component 310 may be configured to receive and communicate geolocation data received from a user and/or a user device associated with the user. For example, after the user has communicatively coupled the user device with the desired streetlight device (e.g., via the application), the user may travel a perimeter of the environment in which the streetlight device is located and the GPS component 310 may track a location of the user and/or the user device 300 and send geolocation data to the streetlight device while the user is traveling the perimeter of the environment. As the user walks the perimeter of the environment and sends the geolocation data to the streetlight device (via the GPS component 310), the streetlight device may map the perimeter of the environment and store the map in a memory of the streetlight device. In some cases, as the user walks the perimeter of the environment and the user device continuously transmits (e.g., every 0.5 seconds, every 1 second, every 5 seconds, etc.) geolocation data to the streetlight device, via GPS component 310, the user may also indicate to the streetlight device locations of other fixtures located in the environment (e.g., other streetlight devices, porch lights, etc.) and the streetlight device may include these indications of the other fixtures in the stored map. In some examples, the application component 304 and/or the user device may communicatively couple to each of the fixtures and send the geolocation data, via the GPS component 310, the user input (e.g., illumination settings, intensity settings, etc.) and/or the map to each of the fixtures. In some examples, the user may travel within the perimeter of the environment and indicate to the streetlight device and/or the other fixtures within the environment which areas and/or locations within the environment need to be illuminated, darkened, dimmer, and/or brighter. In some cases, this user input may be communicated to the streetlight device and/or other fixtures such that the streetlight device and/or other fixtures may adjust in real time. In some cases, the streetlight device and/or other fixtures within the environment may use alternative and/or additional methods to determine the user and/or user device location, such as utilizing relative positioning based on a radio frequency signal strength from the streetlight device, the other fixtures, and/or the user device.

The user device 300 may also include additional data storage devices (removable and/or non-removable) such as, for example, magnetic disks, optical disks, or tape. Such additional storage is illustrated in FIG. 3 by removable storage 314 and non-removable storage 316. The removable storage 314 and non-removable storage 316 can store the various components 304, 308, 310, and the operating system 306, among other things. This can enable the user device 300 to be fully or partially configured to provide graphical user interfaces (GUIs), for example, to enable users and/or technicians to connect to the user device 300. The removable storage 314 and non-removable storage 316 can also include setup menus, other GUIs, and other functions.

Non-transitory computer-readable media may include volatile and nonvolatile, removable and non-removable tangible, physical media implemented in technology for storage of information, such as computer readable instructions, data structures, program component, or other data. The memory 302, removable storage 314, and non-removable storage 316 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the user device 300. Any such non-transitory computer-readable media may be part of the user device 300 or may be a separate database, databank, remote server, or cloud-based server.

In some implementations, the transceivers 318 include any sort of micro wireless devices known in the art. In some examples, the transceivers 318 can include wireless modem(s) to facilitate wireless connectivity between users and the cellular network, the Internet and/or an intranet via a cellular connection. Further, the transceivers 318 may include a radio micro wireless device that performs the function of transmitting and receiving radio frequency communications via an antenna (e.g., Wi-Fi or Bluetooth). In other examples, the transceivers 318 may include wired communication components, such as a wired modem or Ethernet port, for communicating with technicians, for example, and the provider's Internet-based network.

In some implementations, the output device(s) 320 include any sort of output devices known in the art, such as a display (e.g., a liquid crystal or thin-film transistor (TFT) display), a touchscreen display, loudspeakers, a vibrating mechanism, or a tactile feedback mechanism. In some examples, the output devices can play various sounds based on, for example, whether the user device 300 is connected to a network, the type of connections (e.g., cellular vs. Wi-Fi), the number of active calls, etc. for testing purposes. Output device(s) 320 also include ports for one or more peripheral devices, such as headphones, peripheral speakers, or a peripheral display for use by technicians during maintenance procedures, among other things.

In various implementations, input device(s) 322 include any sort of input devices known in the art. For example, the input device(s) 322 may include one or more still or video cameras (e.g., camera 324, discussed above), a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Example Methods

FIGS. 4-9 are flow diagrams showing example processes representative of techniques for adjusting configuration of at least one streetlight device in an environment. The processes may, but need not necessarily, be implemented in whole or in part by or within the environment 100 and/or one or more of the devices of FIGS. 1 through 3. In the examples and techniques discussed herein, the methods of operation may be performed by one or more application specific integrated circuits (ASICs) or may be performed by a general-purpose processor utilizing software defined in computer readable media. In the examples and techniques discussed herein, the memories discussed herein may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. The various algorithms, machine learned models, logical expressions, functions, steps, and/or operations of the processes described herein may be encoded in computer-readable instructions, data structures, program modules, and/or other data to implement the various techniques described herein.

As defined herein, computer-readable media includes non-transitory computer-readable media as well as transitory media, such as modulated data signals and carrier waves, and/or signals.

Figure 4:
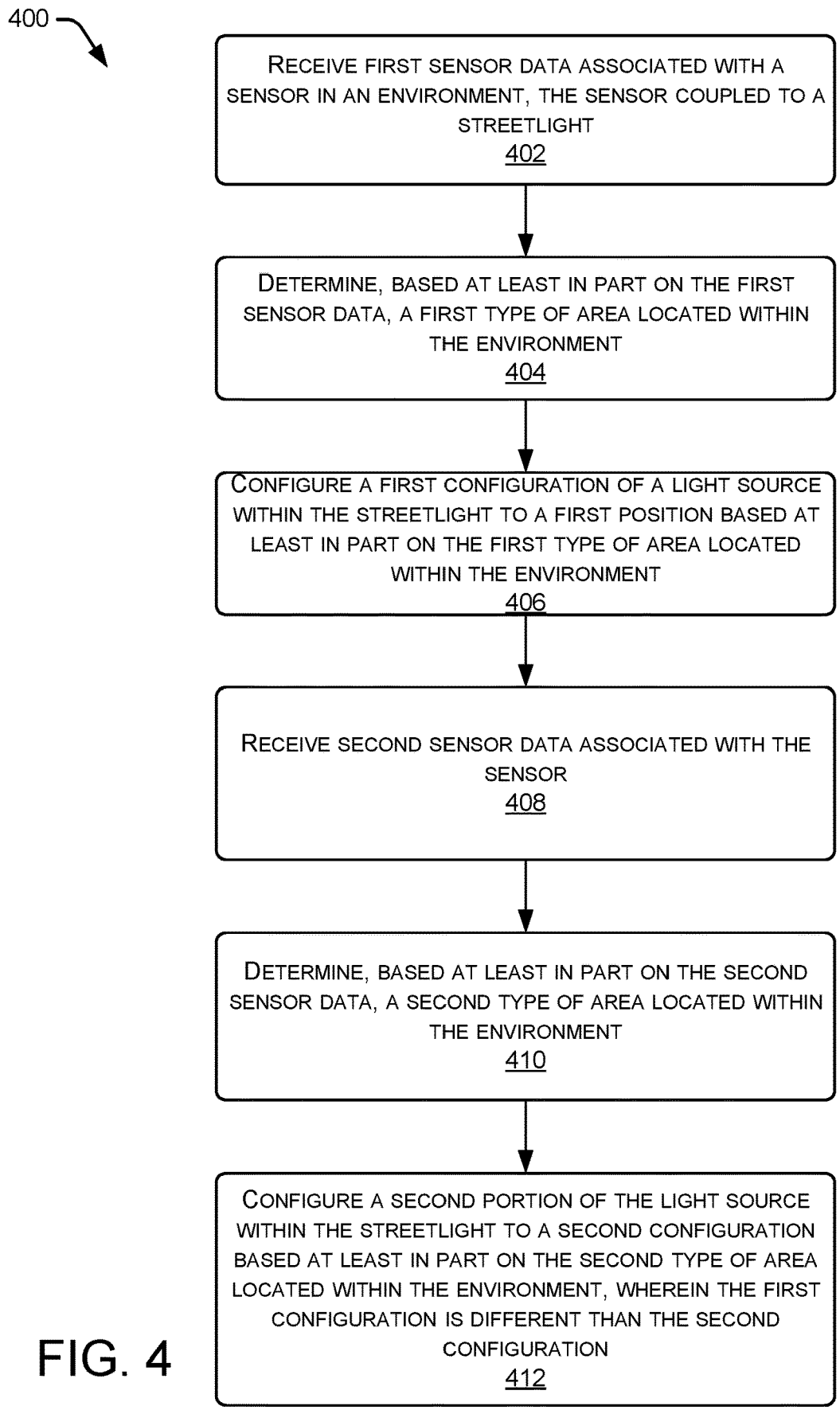
FIG. 4 is a flowchart depicting an example process for configuring a light source using one or more example components of an example device.

FIG. 4 is a flowchart depicting an example process 400 for configuring a portion of a light source within a streetlight using one or more example components of an example device.

At operation 402, the process 400 may include receiving first sensor data associated with a sensor in an environment, the sensor coupled to a streetlight. For example, the analysis component 118 can receive sensor data (e.g., audio data, image data, etc.) from the sensor(s) 108 as input to determine other types of information associated with the streetlight device 102 and/or the environment 100.

At operation 404, the process 400 may include determining, based at least in part on the first sensor data, a first type of area located within the environment. For example, the analysis component 118 may process sensor data to determine or otherwise detect a distance (e.g., a height of a pole coupled with the streetlight relative to a surface of the environment), an angle in which the streetlight device 102 is coupled to the pole, a type of surface being lit (e.g., blacktop, concrete, grass, etc.), an amount of light present from surrounding fixtures (e.g., streetlights), a type of area (parking lot, sidewalk, walking trail, street, etc.), or the like. In some examples, the analysis component 118 can receive sensor data from one or more sensors coupled to a streetlight adjacent a street, sidewalk, parking lot, or other public space.

At operation 406, the process 400 may include configuring a first portion of a light source within the streetlight to a first configuration based at least in part on the first type of area located within the environment. For example, the techniques can include the analysis component 118 processing the sensor data to identify an environment as well as different types of areas (e.g., parking lot, sidewalk, walking trail, street, etc.) within the environment and their respective lighting settings (e.g., illuminate a parking lot and sidewalk but darken a street).

At operation 408, the process 400 may include receiving second sensor data associated with the sensor. For example, the analysis component 118 can receive sensor data (e.g., audio data, image data, etc.) from the sensor(s) 108 as input to determine other types of information associated with the streetlight device 102 and/or the environment 100.

At operation 410, the process 400 may include determining, based at least in part on the second sensor data, a second type of area located within the environment. For example, the analysis component 118 may process sensor data to determine or otherwise detect a distance (e.g., a height of a pole coupled with the streetlight relative to a surface of the environment), an angle in which the streetlight device 102 is coupled to the pole, a type of surface being lit (e.g., blacktop, concrete, grass, etc.), an amount of light present from surrounding fixtures (e.g., streetlights), a type of area (parking lot, sidewalk, walking trail, street, etc.), or the like. In some examples, the analysis component 118 can receive sensor data from one or more sensors coupled to a streetlight adjacent a street, sidewalk, parking lot, or other public space.

At operation 412, the process 400 may include configuring a second portion of the light source within the streetlight to a second configuration based at least in part on the second type of area located within the environment, wherein the first configuration is different than the second configuration. For example, lighting component 120 may be configured to control one or more aspects of the lighting source 106. The lighting component 120 can receive inputs from the analysis component 118, the mapping component 122, the GPS component 124, and other components and, in turn, can control the frequency and/or voltage of the power applied to the light source 106. Thus, the lighting component 120 may, for example, slowly increase voltage to the light source 106 as the sun sets, and vice-versa, to maintain a consistent level of illumination at the street level. The lighting component 120 may also be configured to adjust features of the light source 106 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

Figure 5:
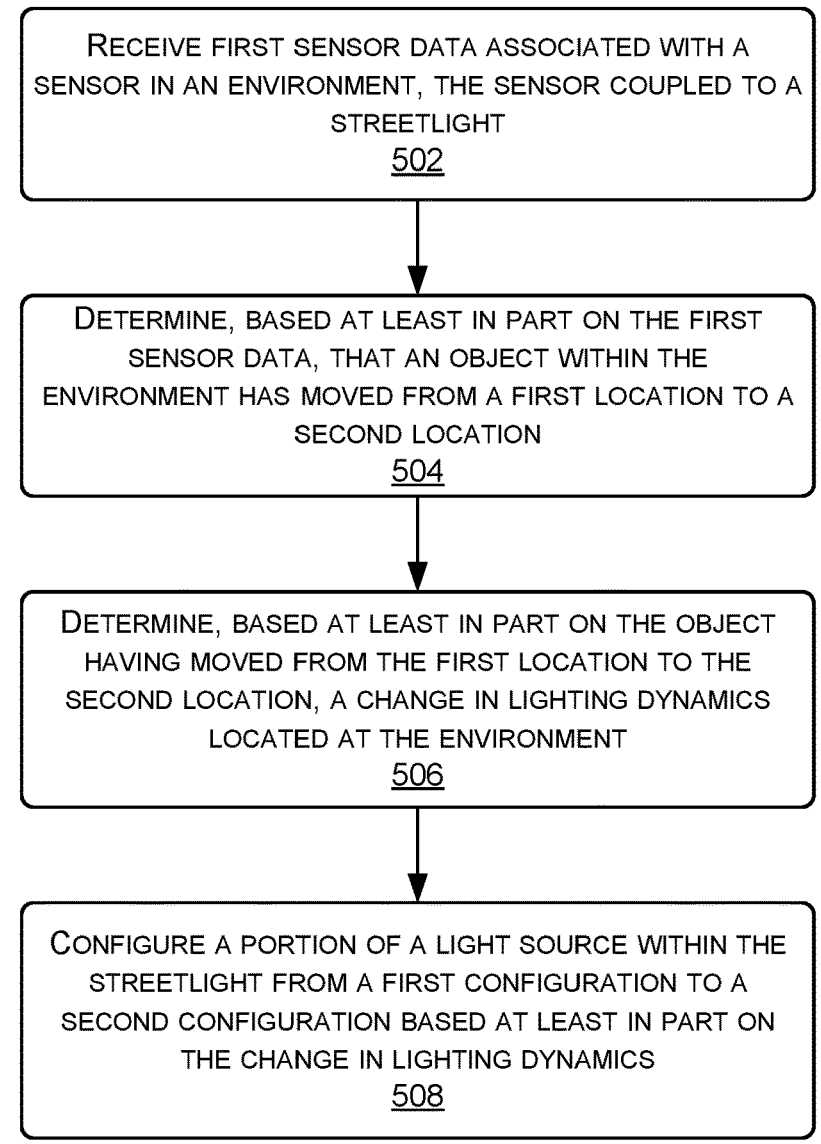
FIG. 5 is a flowchart depicting an example process for configuring a light source using one or more example components of an example device.

FIG. 5 is a flowchart depicting an example process 500 for configuring a portion of a light source within a streetlight using one or more example components of an example device.

At operation 502, the process 500 may receive first sensor data associated with a sensor in an environment, the sensor coupled to a streetlight. For example, the analysis component 118 can receive sensor data (e.g., audio data, image data, etc.) from the sensor(s) 108 as input to determine other types of information associated with the streetlight device 102 and/or the environment 100.

At operation 504, the process 500 may include determining, based at least in part on the first sensor data, that an object within the environment has moved from a first location to a second location. For example, the analysis component 118 can receive sensor data (e.g., audio data, image data, etc.) from the sensor(s) 108 as input to determine that an object has moved within the environment 100 from a first location to a second location. For example, in a parking lot, a vehicle may have exited the parking lot and/or may have entered the parking lot, thereby changing the lighting dynamics within the parking lot.

At operation 506, the process 500 may include determining, based at least in part on the object having moved from the first location to the second location, a change in lighting dynamics located at the environment. For example, the analysis component 118 may determine that the lighting direction and/or the lighting intensities specified by the user via the user input may no longer be satisfied within the parking lot and may send instructions to the lighting component 120 to adjust the lighting direction and/or the lighting intensities to account for the change in lighting dynamics caused by the object (e.g., if a new vehicle is creating a shaded area in an area specified to be illuminated, the streetlight device 102 may adjust the lighting direction and/or the lighting intensity to illuminate the shaded area). In some examples, the analysis component 118 can implement statistical, mathematical, and/or machine learned algorithms to determine whether the sensor data indicates a change in the lighting dynamics of the environment with respect to the lighting settings specified by the user in the user input.

At operation 508, the process 500 may include configure a portion of a light source within the streetlight from a first configuration to a second configuration based at least in part on the change in lighting dynamics. For example, the lighting component 120 may also be configured to adjust features of the light source 106 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

Figure 6:
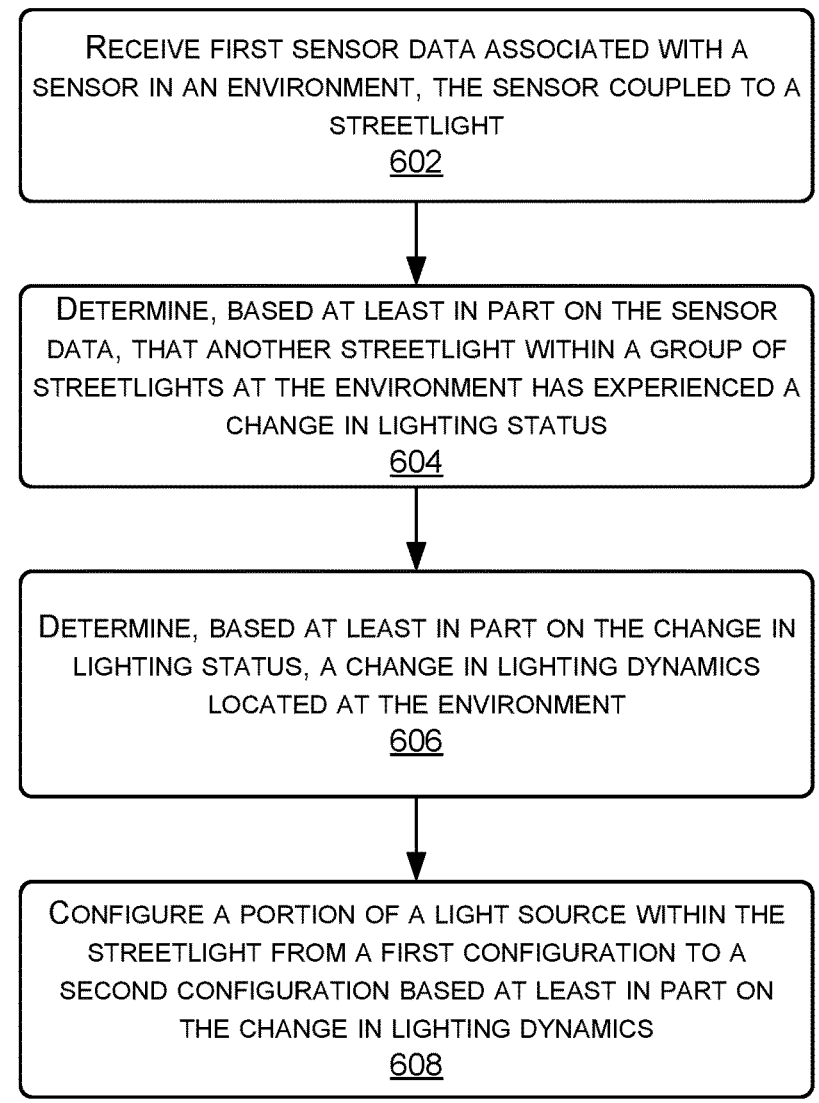
FIG. 6 is a flowchart depicting an example process for configuring a light source using one or more example components of an example device.

FIG. 6 is a flowchart depicting an example process 600 for configuring a portion of a light source within a streetlight using one or more example components of an example device.

At operation 602, the process 600 may receive sensor data associated with a sensor in an environment, the sensor coupled to a streetlight. For example, the analysis component 118 can receive sensor data (e.g., audio data, image data, etc.) from the sensor(s) 108 as input to determine other types of information associated with the streetlight device 102 and/or the environment 100.

At operation 604, the process 600 may include determining, based at least in part on the sensor data, that another streetlight within a group of streetlights at the environment has experienced a change in lighting status. For instance, the communication component 104 may be configured to receive input data from the user device 128 and/or one or more other fixtures within the environment, such as fixture 130 (which may also be a streetlight device). In some cases, this input data from other fixtures in the environment may include a change in lighting status of the fixture (e.g., the fixture has decreased light intensity and/or the fixture has adjusted light direction).

At operation 606, the process 600 may include determining, based at least in part on the change in lighting status, a change in lighting dynamics located at the environment. For example, the analysis component 118 may determine that the lighting direction and/or the lighting intensities specified by the user via the user input may no longer be satisfied within the parking lot and may send instructions to the lighting component 120 to adjust the lighting direction and/or the lighting intensities to account for the change in lighting dynamics caused by the object (e.g., if a new vehicle is creating a shaded area in an area specified to be illuminated, the streetlight device 102 may adjust the lighting direction and/or the lighting intensity to illuminate the shaded area). In some examples, the analysis component 118 can implement statistical, mathematical, and/or machine learned algorithms to determine whether the sensor data indicates a change in the lighting dynamics of the environment with respect to the lighting settings specified by the user in the user input.

At operation 608, the process 600 may include configuring a portion of a light source within the streetlight from a first configuration to a second configuration based at least in part on the change in lighting dynamics. For example, the lighting component 120 may also be configured to adjust features of the light source 106 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

Figure 7:
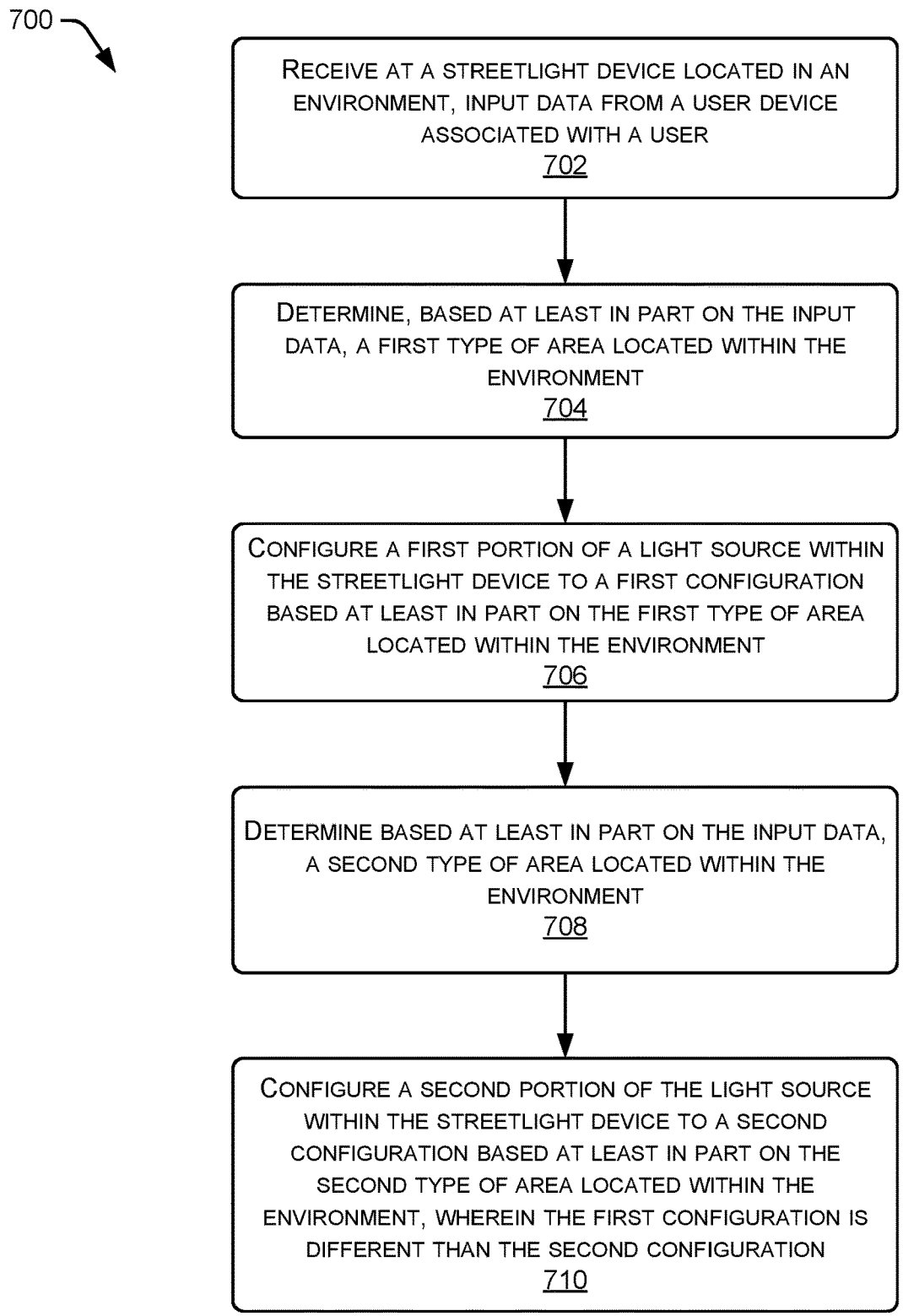
FIG. 7 is a flowchart depicting an example process for configuring a light source using one or more example components of an example device.

FIG. 7 is a flowchart depicting an example process 700 for configuring a portion of a light source within a streetlight using one or more example components of an example device.

At operation 702, the process 700 may include receiving, at a streetlight device located in an environment, input data from a user device associated with a user. For example, the streetlight device may determine how to adjust the configuration of the light source and/or the intensity of the light source based on input data received from a user and/or a user device associated with the user. For example, the user device may store and/or otherwise have access to an application configured to present light setting options and to receive user input including instructions for adjusting light direction and light intensity from streetlights in an environment.

At operation 704, the process 700 may include determining, based at least in part on the input data, a first type of area located within the environment. For example, the user may capture image data of the environment, such as image data 132, in which the streetlight device 102 is located using the camera 324 of the user device 128 and the application may receive the image data to be used for further user input. For example, the application may present the image data 132 (which in this case, may be an image and/or map of a parking lot) on the user device with a grid overlay 134 superimposed over the image data 132. Each segment of the grid overlay 134 may be selectable by the user to indicate whether that particular segment of the image data 132 should be illuminated and/or how much illumination (e.g., a light intensity setting) the segment should receive. For example, the environment shown in the image data 132 may include a parking lot portion, a grass portion, and a street portion. The grid overlay 134 may include segments superimposed over each of the parking lot portion, the grass portion, and the street portion. In some examples, the application may receive user input via the grid overlay 134 indicating that the user desires the grass portion 136 and the street portion 138 should not receive illumination by the streetlight device 102. In some examples, this may be done by selection (e.g., by the user) of the segments overlayed atop the grass portion 136 and the street portion 138 to be darkened areas. In response to receiving selection of the grass portion 136 and the street portion 138, the mapping component 122 may change the color and/or otherwise visually indicate on the image data 132 that the segments selected by the user are not to receive illumination.

At operation 706, the process 700 may include configuring a first portion of a light source within the streetlight device to a first configuration based at least in part on the first type of area located within the environment. For example, once the application has received the illumination settings and the intensity settings for each segment of the grid overlay 134, the application and/or the user device 128 may communicate (e.g., transfer via near field communication (NFC)) the user input (e.g., the grid overlay including the illumination settings and the intensity settings for each segment) to the mapping component 122 of the streetlight device 102. These user input and/or user light settings may be used by the analysis component and/or the lighting component to adjust the light source 106 from a first configuration to a second configuration based on sensor data received from the sensor(s) 108.

At operation 708, the process 700 may include determining, based at least in part on the input data, a second type of area located within the environment. For example, the user may also select portions of the location 126 and the image data 132 that the user does desire to have illuminated by selecting segments overlayed atop the parking lot portion to be illuminated areas.

At operation 710, the process 700 may include configuring a second portion of the light source within the streetlight to a second configuration based at least in part on the second type of area located within the environment, wherein the first configuration is different than the second configuration. For example, lighting component 120 may be configured to control one or more aspects of the lighting source 106. The lighting component 120 can receive inputs from the analysis component 118, the mapping component 122, the GPS component 124, and other components and, in turn, can control the frequency and/or voltage of the power applied to the light source 106. Thus, the lighting component 120 may, for example, slowly increase voltage to the light source 106 as the sun sets, and vice-versa, to maintain a consistent level of illumination at the street level. The lighting component 120 may also be configured to adjust features of the light source 106 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

Figure 8:
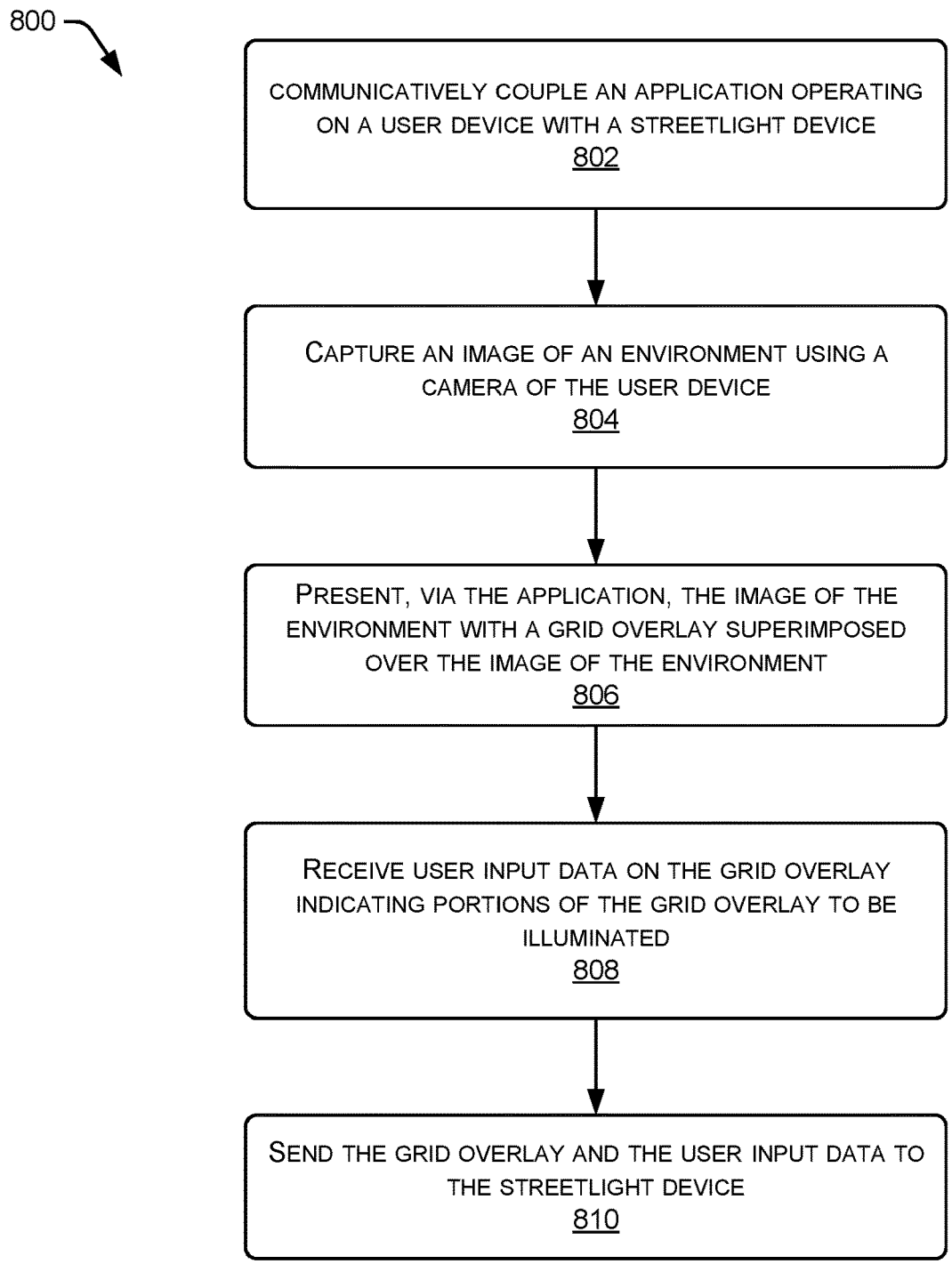
FIG. 8 is a flowchart depicting an example process for configuring a light source using one or more example components of an example device.

FIG. 8 is a flowchart depicting an example process 800 for configuring a portion of a light source within a streetlight using one or more example components of an example device.

At operation 802, the process 800 may include communicatively coupling an application operating on a user device with a streetlight device. For example, the application and/or the user device may communicatively couple to each of the fixtures and send the geolocation data, the user input (e.g., illumination settings, intensity settings, etc.) and/or the map to each of the fixtures. In some cases, the streetlight device may determine how to adjust the configuration of the light source and/or the intensity of the light source based on input data received from a user and/or a user device associated with the user via the application. For example, the user device may store and/or otherwise have access to an application configured to present light setting options and to receive user input including instructions for adjusting light direction and light intensity from streetlights in an environment.

At operation 804, the process 800 may include capturing an image of an environment using a camera of the user device. For example, the user may capture image data of the environment, such as image data 132, in which the streetlight device 102 is located using the camera of the user device 128 and the application may receive the image data to be used for further user input.

At operation 806, the process 800 may include presenting, via the application, the image of the environment with a grid overlay superimposed over the image of the environment. For example, the application may present the image data 132 (which in this case, may be an image and/or map of a parking lot) on the user device with a grid overlay 134 superimposed over the image data 132. Each segment of the grid overlay 134 may be selectable by the user to indicate whether that particular segment of the image data 132 should be illuminated and/or how much illumination (e.g., a light intensity setting) the segment should receive. For example, the environment shown in the image data 132 may include a parking lot portion, a grass portion, and a street portion. The grid overlay 134 may include segments superimposed over each of the parking lot portion, the grass portion, and the street portion.

At operation 808, the process 800 may include receiving user input data on the grid overlay indicating portions of the grid overlay to be illuminated. For example, the application may receive user input via the grid overlay 134 indicating that the user desires the grass portion 136 and the street portion 138 should not receive illumination by the streetlight device 102. In some examples, this may be done by selection (e.g., by the user) of the segments overlayed atop the grass portion 136 and the street portion 138 to be darkened areas. In response to receiving selection of the grass portion 136 and the street portion 138, the mapping component 122 may change the color and/or otherwise visually indicate on the image data 132 that the segments selected by the user sending the grid overlay and the user input data to the streetlight device are not to receive illumination. In some examples, the user may also select portions of the location 126 and the image data 132 that the user does desire to have illuminated by selecting segments overlayed atop the parking lot portion to be illuminated areas.

At operation 810, the process 800 may include sending the grid overlay and the user input data to the streetlight device. For example, once the application has received the illumination settings and the intensity settings for each segment of the grid overlay 134, the application and/or the user device 128 may communicate (e.g., transfer via near field communication (NFC)) the user input (e.g., the grid overlay including the illumination settings and the intensity settings for each segment) to the mapping component 122 of the streetlight device 102. These user input and/or user light settings may be used by the analysis component 118 and/or the lighting component 120 to adjust the configuration of the light source 106 based on sensor data received from the sensor(s) 108.

Figure 9:
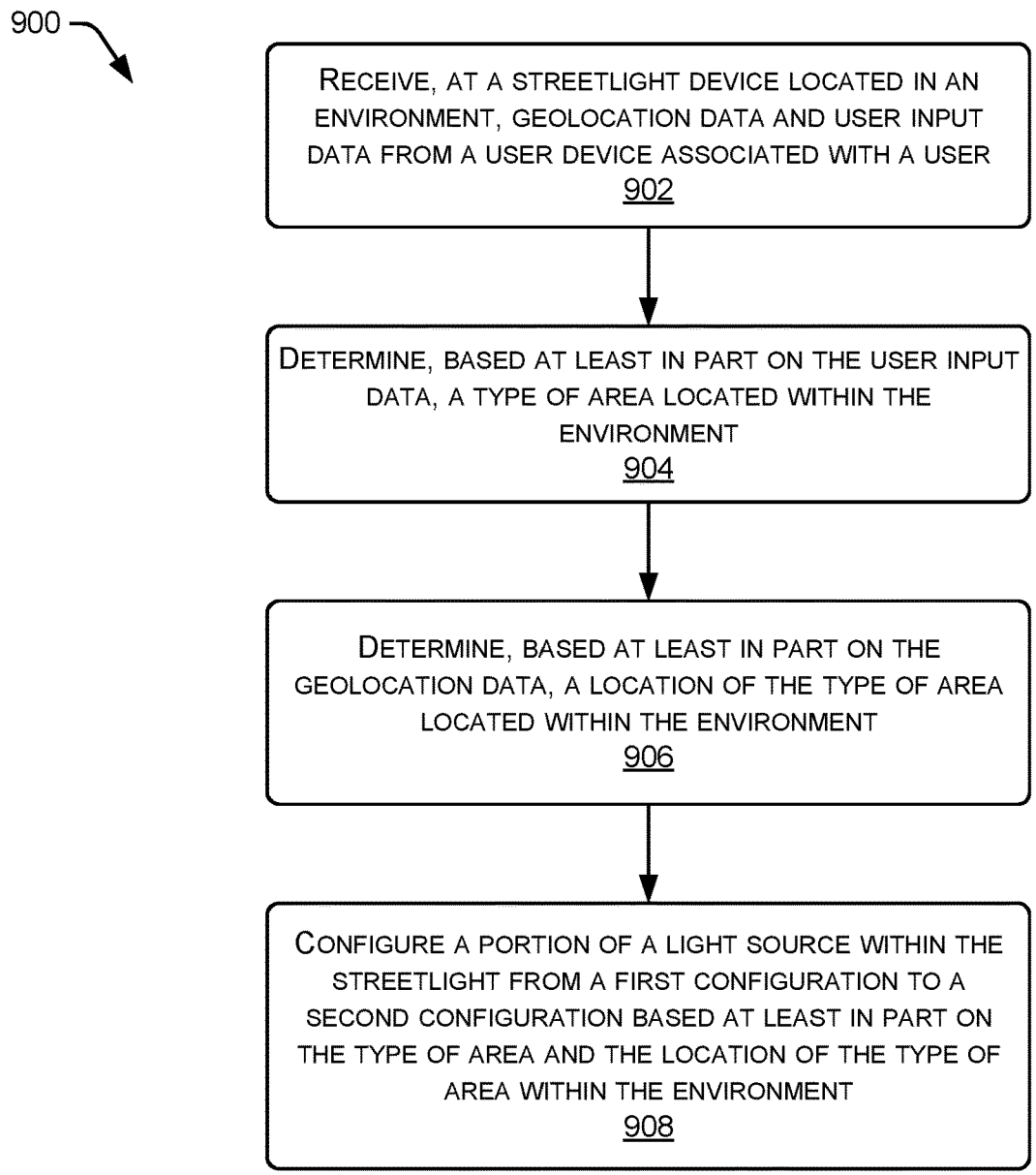
FIG. 9 is a flowchart depicting an example process for configuring a light source using one or more example components of an example device.

FIG. 9 is a flowchart depicting an example process 900 for configuring a portion of a light source within a streetlight using one or more example components of an example device.

At operation 902, the process 900 may include receiving, at a streetlight device located in an environment, geolocation data and user input data from a user device associated with a user. For example, a GPS component 124 may be configured to enable the streetlight device 102 to determine how to adjust the configuration of the light source 106 and/or the intensity of the light source 106 based on input data and/or geolocation data received from a user and/or a user device 128 associated with the user. For example, after the user has communicatively coupled the user device 128 with the desired streetlight device 102 (e.g., via the application), the user may travel a perimeter of the environment 100 and/or the location 126 in which the streetlight device 102 is located and send geolocation data to the streetlight device 102 via the user device 128 while the user is traveling the perimeter of the environment 100 and/or location 126. As the user walks the perimeter of the environment 100 and/or location 126 and sends the geolocation data to the streetlight device 102, the streetlight device 102 may map the perimeter of the environment 100 and/or location 126 and generate image data, such as the image data 132, and store the map and/or the image data 132 in a memory of the streetlight device 102. In some cases, as the user walks the perimeter of the environment 100 and/or location 126 and the user device 128 continuously transmits (e.g., every 0.5 seconds, every 1 second, every 5 seconds, etc.) geolocation data to the streetlight device 102, the user may also indicate to the streetlight device 102 locations of other fixtures located in the environment 100 and/or location 126 (e.g., other streetlight devices, porch lights, the fixture 130, etc.) and the streetlight device 102 may include these indications of the other fixtures in the stored image data 132 and/or the map (e.g., the map may include the image data 132). In some examples, the application and/or the user device 128 may communicatively couple to each of the fixtures and send the geolocation data, the user input (e.g., illumination settings, intensity settings, etc.) and/or the image data 132 and/or the map to each of the fixtures. In some examples, the user may travel within the perimeter of the environment 100 and/or location 126 and indicate to the streetlight device 102 and/or the other fixtures within the environment 100 and/or location 126 which areas and/or locations within the environment 100 and/or location 126 need to be illuminated, darkened, dimmer, and/or brighter. In some cases, this user input may be communicated to the streetlight device 102 and/or other fixtures such that the streetlight device 102 and/or other fixtures may adjust in real time. In some cases, the streetlight device 102 and/or other fixtures within the environment 100 and/or location 126 may use alternative and/or additional methods to determine the user and/or user device 128 location, such as utilizing relative positioning based on a radio frequency signal strength from the streetlight device 102, the other fixtures, and/or the user device 128.

At operation 904, the process 900 may include determining, based at least in part on the user input data, a type of area located within the environment. For example, the analysis component 118 can receive sensor data (e.g., audio data, image data, etc.) from the sensor(s) 108 as input to determine other types of information associated with the streetlight device 102 and/or the environment 100. For example, the analysis component 118 may process sensor data to determine or otherwise detect a distance (e.g., a height of a pole coupled with the streetlight relative to a surface of the environment), an angle in which the streetlight device 102 is coupled to the pole, a type of surface being lit (e.g., blacktop, concrete, grass, etc.), an amount of light present from surrounding fixtures (e.g., streetlights), a type of area (parking lot, sidewalk, walking trail, street, etc.), or the like.

At operation 906, the process 900 may include determining, based at least in part on the geolocation data, a location of the type of area located within the environment. For example, the analysis component 118 may process the sensor data to identify an environment as well as different types of areas (e.g., parking lot, sidewalk, walking trail, street, etc.) within the environment and their respective lighting settings (e.g., illuminate a parking lot and sidewalk but darken a street).

At operation 908, the process 900 may include configuring a portion of a light source within the streetlight from a first configuration to a second configuration based at least in part on the type of area and the location of the type of area within the environment. For example, the lighting component 120 may be configured to control one or more aspects of the lighting source 106. The lighting component 120 can receive inputs from the analysis component 118, the mapping component 122, the GPS component 124, and other components and, in turn, can control the frequency and/or voltage of the power applied to the light source 106. Thus, the lighting component 120 may, for example, slowly increase voltage to the light source 106 as the sun sets, and vice-versa, to maintain a consistent level of illumination at the street level. The lighting component 120 may also be configured to adjust features of the light source 106 including but not limited to an adjustable shutter system (e.g., a physical shutter system that angles or blocks light), an adjustable LED array (e.g., selectively disabling/adjusting individual directed LEDs), an adjustable micro-electro-mechanical systems (MEMS) mirror chip array, or any combination therein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. For example, the operation 408 may be omitted and sensor data can be received from one or more additional sensors automatically without sending a request to the additional sensor(s). Moreover, the methods described herein can be combined in whole or in part with each other or with other methods.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    communicatively coupling a streetlight with an application operating on a user device;
    capturing an image of an environment using a camera of the streetlight;
    sending, via the application, the image of the environment to the user device;
    receiving user input data including a visual indicator overlaid over the image to indicate selected portions to be illuminated;
    receiving first sensor data associated with a sensor in an environment, the sensor coupled to the streetlight;
    determining, based at least in part on the first sensor data, a first type of area located within the environment;
    configuring a first portion of a light source within the streetlight to a first configuration based at least in part on the first type of area located within the environment and the user input data;
    receiving second sensor data associated with the sensor or another sensor;
    determining, based at least in part on the second sensor data, a second type of area located within the environment; and
    configuring a second portion of the light source within the streetlight to a second configuration based at least in part on the second type of area located within the environment and the user input data, wherein the first configuration is different than the second configuration.

2. The method of claim 1, wherein the first configuration causes the first portion of the light source to illuminate the first type of area and the second configuration causes the second portion of the light source to darken the second type of area.

3. The method of claim 1, further comprising receiving instructions to illuminate or darken portions of the environment based on determining types of areas associated with each of the portions of the environment.

4. The method of claim 1, wherein at least one of the first type of area or the second type of area include at least one of:
    a street;
    a sidewalk;
    a parking lot;
    a walking path;
    a no trespassing zone;
    a residential area;
    a landscaped area; or
    a commercial business area.

5. The method of claim 1, further comprising:
    determining a type of material from which a surface in the environment is made; and
    configuring the second portion of the light source within the streetlight to the second configuration based at least in part on the type of material, wherein the type of material includes at least one of blacktop, concrete, grass, metal, asphalt, dirt, gravel, clay, bark, rock, or glass.

6. The method of claim 1, further comprising configuring at least one of the first portion of the light source or the second portion of the light source to a third configuration based at least in part on a height of a pole coupled to the streetlight, an angle at which the light source is coupled to the pole, a configuration of the light source within the environment, or one or more light source configurations of surrounding light sources.

7. The method of claim 1, wherein the sensor comprises at least one of a photoelectric sensor, a microphone, a camera, a location sensor, a lidar sensor, a radar sensor, or a temperature sensor.

8. One or more non-transitory computer-readable media storing instructions executable by one or more processors, wherein the instructions, when executed, cause the one or more processors to perform operations comprising:
    communicatively coupling a streetlight with an application operating on a user device;
    capturing an image of an environment using a camera of the streetlight;
    sending, via the application, the image of the environment to the user device;
    receiving user input data including a visual indicator overlaid over the image to indicate selected portions to be illuminated;
    receiving first sensor data associated with a sensor in an environment, the sensor coupled to the streetlight;
    determining, based at least in part on the first sensor data, that an object within the environment has moved from a first location to a second location;
    determining, based at least in part on the object having moved from the first location to the second location and the user input data, a change in lighting dynamics located at the environment; and
    configuring a portion of a light source within the streetlight from a first configuration to a second configuration based at least in part on the change in lighting dynamics.

9. The one or more non-transitory computer-readable media of claim 8, wherein the object comprises a vehicle and the second configuration of the portion of the light source causes an area in which the vehicle was located to illuminate or darken.

10. The one or more non-transitory computer-readable media of claim 8, further comprising receiving instructions to change configurations of the portion of the light source based on one or more object changing locations within a boundary of the environment.

11. The one or more non-transitory computer-readable media of claim 8, further comprising determining a type of area associated with a location of the object, wherein configuring the portion of the light source within the streetlight from the first configuration to the second configuration is based at least in part on the type of area, the type of area including at least one of:
a street;
a sidewalk;
a parking lot;
a walking path;
a no trespassing zone;
a residential area;
a landscaped area; or
a commercial business area.

12. The one or more non-transitory computer-readable media of claim 11, wherein the type of areas include at least one of blacktop, concrete, grass, metal, asphalt, dirt, gravel, clay, bark, rock, or glass.

13. The one or more non-transitory computer-readable media of claim 8, further comprising configuring the portion of the light source to a third configuration based at least in part on a height of a pole coupled to the streetlight, an angle at which the light source is coupled to the pole, a configuration of the light source within the environment, or one or more light source configurations of surrounding light sources.

14. The one or more non-transitory computer-readable media of claim 8, wherein the sensor comprises at least one of a photoelectric sensor, a microphone, a camera, a location sensor, a lidar sensor, a radar sensor, or a temperature sensor.

15. A streetlight device, comprising:
one or more processors; and
one or more non-transitory computer-readable media storing instructions executable by the one or more processors, wherein the instructions, when executed, cause the streetlight device to perform operations comprising:
communicatively coupling with an application operating on a user device;
capturing an image of an environment using a camera;
sending, via the application, the image of the environment to the user device;
receiving user input data including a visual indicator overlaid over the image to indicate selected portions to be illuminated;
receiving sensor data associated with a sensor in an environment, the sensor coupled to a first streetlight;
determining, based at least in part on the sensor data, that a second streetlight within a group of streetlights at the environment has experienced a change in lighting status;
determining, based at least in part on the change in lighting status and the user input data, a change in lighting dynamics located at the environment; and
configuring a portion of a light source within the first streetlight from a first configuration to a second configuration based at least in part on the change in lighting dynamics.

16. The streetlight device of claim 15, wherein the sensor comprises a photoelectric sensor and the sensor data includes light sensor data, the second configuration of the portion of the light source causing an area in which the second streetlight is located to illuminate or darken.

17. The streetlight device of claim 15, further comprising receiving instructions to change configurations of the portion of the light source based on changes in lighting dynamics at the environment.

18. The streetlight device of claim 15, wherein the sensor data includes a message indicating that the second streetlight is experiencing the change in lighting status and the second configuration of the portion of the light source causing an area in which the second streetlight is located to illuminate or darken.

19. The streetlight device of claim 18, wherein the message is received from at least one of the second streetlight or a central office.

20. The streetlight device of claim 15, further comprising configuring the portion of the light source to a third configuration based at least in part on a height of a pole coupled to the first streetlight, an angle at which the light source is coupled to the pole, a configuration of the light source within the environment, or one or more light source configurations of surrounding light sources.

* * * * *